United States Patent
Fuse

[11] Patent Number: 4,910,373
[45] Date of Patent: Mar. 20, 1990

[54] EXCHANGEABLE GUN ARM WELDING GUN AND GUN ARM EXCHANGE APPARATUS

[75] Inventor: Genzo Fuse, Sayama, Japan
[73] Assignee: Honda Giken Kogyo Kabushiki Kaisha, Tokyo, Japan
[21] Appl. No.: 316,734
[22] Filed: Feb. 28, 1989
[30] Foreign Application Priority Data
  Mar. 4, 1988 [JP] Japan ................... 63-49586
[51] Int. Cl.⁴ ............................................. B23K 11/30
[52] U.S. Cl. ................................ 219/86.8; 219/86.25; 219/119; 901/42
[58] Field of Search .................. 219/86.8, 86.25, 86.33, 219/89, 119; 901/42

[56] References Cited

U.S. PATENT DOCUMENTS 3,238,352  3/1966  Kollmann et al. ............... 219/86.25
  4,762,976  8/1988  Miller et al. ...................... 219/86.25
  4,794,221 12/1988  Takabe et al. ..................... 219/86.8

FOREIGN PATENT DOCUMENTS 597523  3/1978  U.S.S.R. ............................ 219/86.25

Primary Examiner—Clifford C. Shaw
Attorney, Agent, or Firm—Armstrong, Nikaido, Marmelstein, Kubovcik & Murray

[57] ABSTRACT

The gun arm has a tail end portion provided with a flange with notches therein and a tapered portion extending rearwards from the flange. The arm holder on the gun body has a tapered hole formed to allow the tapered portion to be fitted thereinto via a receiving recess. Locking projections corresponding in shape to the notches of the flange are provided along the inner circumference of the opening end of the receiving recess. The exchange apparatus includes a gun arm indexing magazine with a plurality of gun arm holders, and a transfer device for transferring gun arms back and forth between the magazine and the welding gun.

6 Claims, 4 Drawing Sheets

EXCHANGEABLE GUN ARM WELDING GUN AND GUN ARM EXCHANGE APPARATUS

BACKGROUND

This invention relates to an exchangeable gun arm welding gun in which a gun arm is detachably fitted to an arm holder, and to a gun arm exchange apparatus therefor.

As disclosed in Japanese Unexamined Utility Model Registration Application Publication, Jikkai Sho 49-14738, a welding gun is known having a shaft portion on the tail end of a gun arm inserted into a hole provided in the arm holder fitted to the gun body. The shaft portion is fastened securely to the arm holder by tightening a bolt inserted in a direction perpendicular to the hole.

In this known welding gun, the fastening bolt can be loosened for exchanging of the gun arm, but it has to be loosened and tightened each time the gun arm is exchanged, so that it would take considerable labor and time to carry out the exchange operation.

In view of the above-noted problem, the object of the present invention is to provide a welding gun that permits the gun arm to be exchanged or replaced with another one by easy one-touch operations without use of a fastening bolt, and further to provide a gun arm exchange apparatus that can carry out an automatic gun arm exchange operation.

SUMMARY OF THE INVENTION

To achieve the above object, the welding gun according to the first aspect of the present invention includes a gun arm having a tail end portion provided with a flange with notches and a tapered portion formed to extend rearwards of the flange, and an arm holder having a tapered hole formed to allow the tapered portion to be fitted thereinto via a receiving recess which turnably receives the flange. Locking projections corresponding in shape to the notches of the flange are provided along the inner circumference of the opening end of the receiving recess.

The foregoing welding gun may additionally have a secondary terminal of a transformer mounted on the gun body connected to the arm holder. A cooling water supply port communicating with the tapered hole can also be formed in the arm holder.

In order to permit the gun arm of the foregoing welding gun to be exchanged automatically, the present invention provides a gun arm exchange apparatus comprising: a gun arm stocker having a plurality of holders which detachably hold gun arms; and a transfer device that transfers a gun arm from one to the other between the gun arm stocker and the welding gun, wherein said transfer device comprises a tool holder which is movable between a first position on the gun arm stocker side and a second position on the welding gun side and which is also movable back and forth in the X-axis direction consistent with the hole axis of the tapered hole formed in the arm holder of the welding gun, and a clamp member that holds the gun arm. The clamp member is provided on the tool holder in such a manner as to be turnable around the axial line in the X-axis direction.

As the gun arm is inserted into the arm holder with the notches of the flange aligned in phase with the locking projections, the flange is inserted into the receiving recess and the tapered portion inserted into the tapered hole. As the gun arm is turned thereafter, the flange becomes engaged with the back surfaces of the locking projections to have the gun arm securely attached to the arm holder.

In a welding gun as described above, power is supplied to the gun arm through the arm holder while cooling water is supplied to the gun arm through the cooling water supply port. In this manner, it is not necessary to detach and attach the power supply member and the water supply pipe each time the gun arm is exchanged, thus facilitating the gun arm exchange operation.

For exchanging a gun arm with another one by means of the exchange apparatus described above, the welding gun is first moved to the exchange site where the exchange apparatus is disposed and the tool holder of the transfer device is also moved to the second position so as to clamp the gun arm attached to the arm holder of the welding gun with the clamp member. In this condition, the clamp member is turned to turn the gun arm until the notches of the flange are aligned in phase with the locking projections and thereafter the tool holder is moved back in the X-axis direction to pull the gun arm from the arm holder.

Next, the tool holder is moved to the first position to transfer the removed gun arm to an empty one of the holders of the arm stocker and then clamp another gun arm which is being received from one of the holders holding gun arms with the clamp member. The tool holder is then moved back to the second position and thereafter moved forth in the X-axis direction to insert the tapered portion of the gun arm and the flange respectively into the tapered hole of the arm holder and the receiving recess. Thereafter, the clamp member is turned in the direction opposite to the foregoing one to engage the flange with the back sides of the locking projections and then the clamp member is opened to complete the gun arm exchange operation.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
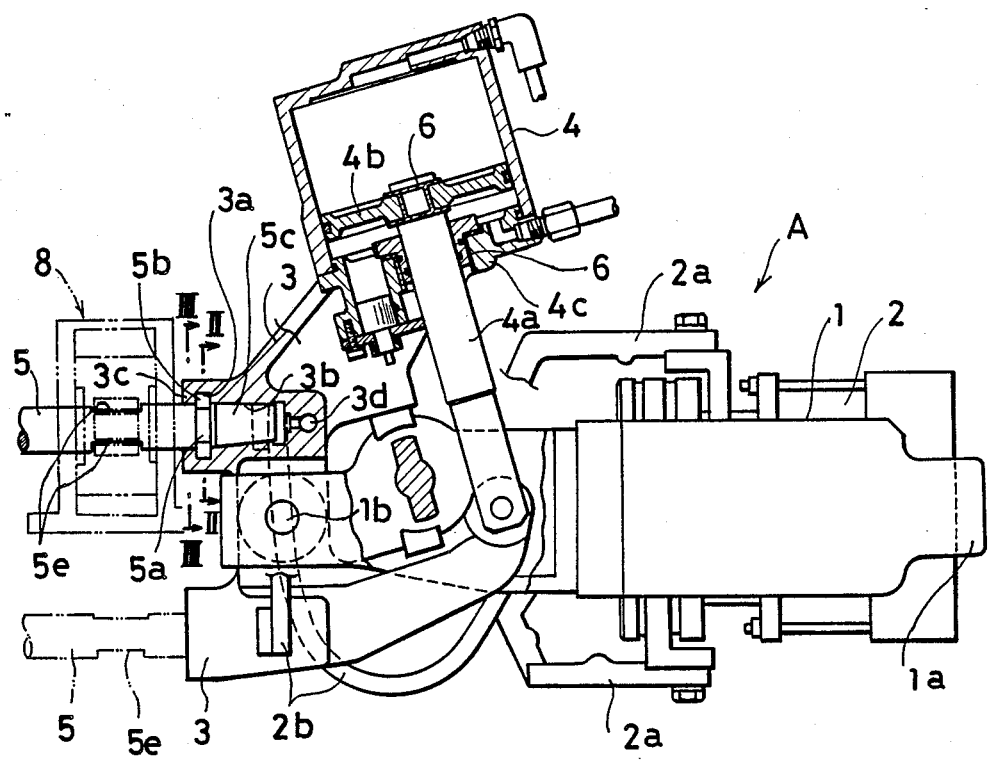
FIG. 1 is partially sectioned side view of an embodiment of a welding gun according to the present invention.

Referring to FIG. 1, a welding gun body has a mounting base 1a on the tail end thereof for mounting on a robot. A transformer 2 is mounted on the gun body 1. A pair of arm holders 3, 3 are pivotally attached to the front end portion of the gun body 1 and are swingable about the pivot 1b. A pressure cylinder 4 is provided between the tail end portions of the two arm holders 3, 3 so that a pair of gun arms 5, 5 attached to the two arm holders 3, 3 may be opened and closed by operation of the pressure cylinder 4, all of these combining to constitute an X-type welding gun as a whole.

Figure 2:
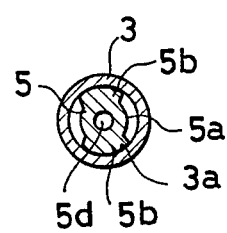
FIGS. 2 and 3 are respectively a sectional view taken along the line II—II and another taken along the line III—III, both in FIG. 1.
Figure 3:
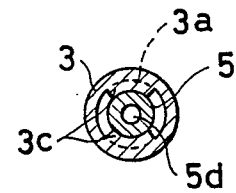

Each gun arm 5 is provided with a flange 5b at the tail end portion thereof having notches 5a as shown in FIG. 2 and with a tapered portion 5c extending therefrom rearwards of the flange as shown in FIG. 1. Each arm holder 3 is provided with a receiving recess 3a which turnably receives the flange 5 and further with a tapered hole 3b formed at the bottom portion thereof to receive the tapered portion 5c fitly therein. Locking projections 3c are provided on the inner circumference of the opening end of the receiving recess 3a corresponding in shape to the notches 5a, as shown in FIG. 3, so that when the notches 5a are set in the phase in which they are aligned with the corresponding locking projections 3c (this phase hereinafter referred to as the "detachable phase"), the gun arm becomes detachable with respect to the arm holder 3. When the flange 5b and the tapered portion 5c are inserted respectively into the receiving recess 3a and the tapered hole 3b in the detachable phase and the gun arm 5 is turned 90 degrees, the flange 5b is turned to the phase in which it becomes engaged with the back sides of the locking projections (this phase hereinafter referred to as the "engagement phase") and the gun arm 5 is thus securely locked in the arm holder 3.

Each secondary terminal 2a of the transformer 2 is connected to each arm holder 3 through an ounce copper plate 2b and a cooling water supply port 3d is formed in the arm holder which communicates with the tapered hole 3b in order to power and water to the gun arm 5 through the arm holder 3. It is thus unnecessary to connect and disconnect the ounce copper plate 2b and the water supply pipe when the gun arm 5 is being exchanged. A water passage 5d is provided along the center of the gun arm. A flat portion 5e is provided on the gun arm 5 for clamping.

An insulator 6 is interposed between a piston rod 4a and piston 4b, both of the pressure cylinder 4, and between the piston rod 4a and a cylinder cover 4c in which the piston rod is inserted. This prevents a short circuiting that could take place therebetween through the piston rod 4a of the pressure cylinder 4 when power is supplied to both arm holders 3,3.

Figure 4:
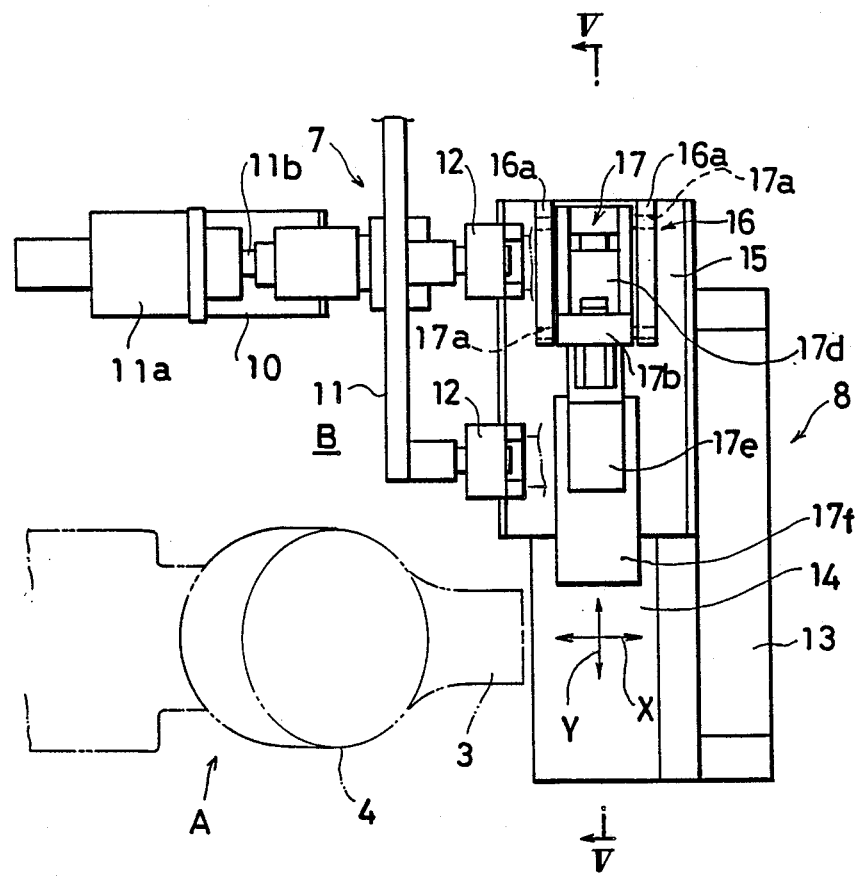
FIG. 4 is a top plan view of a gun arm exchange apparatus according to the present invention.
Figure 5:
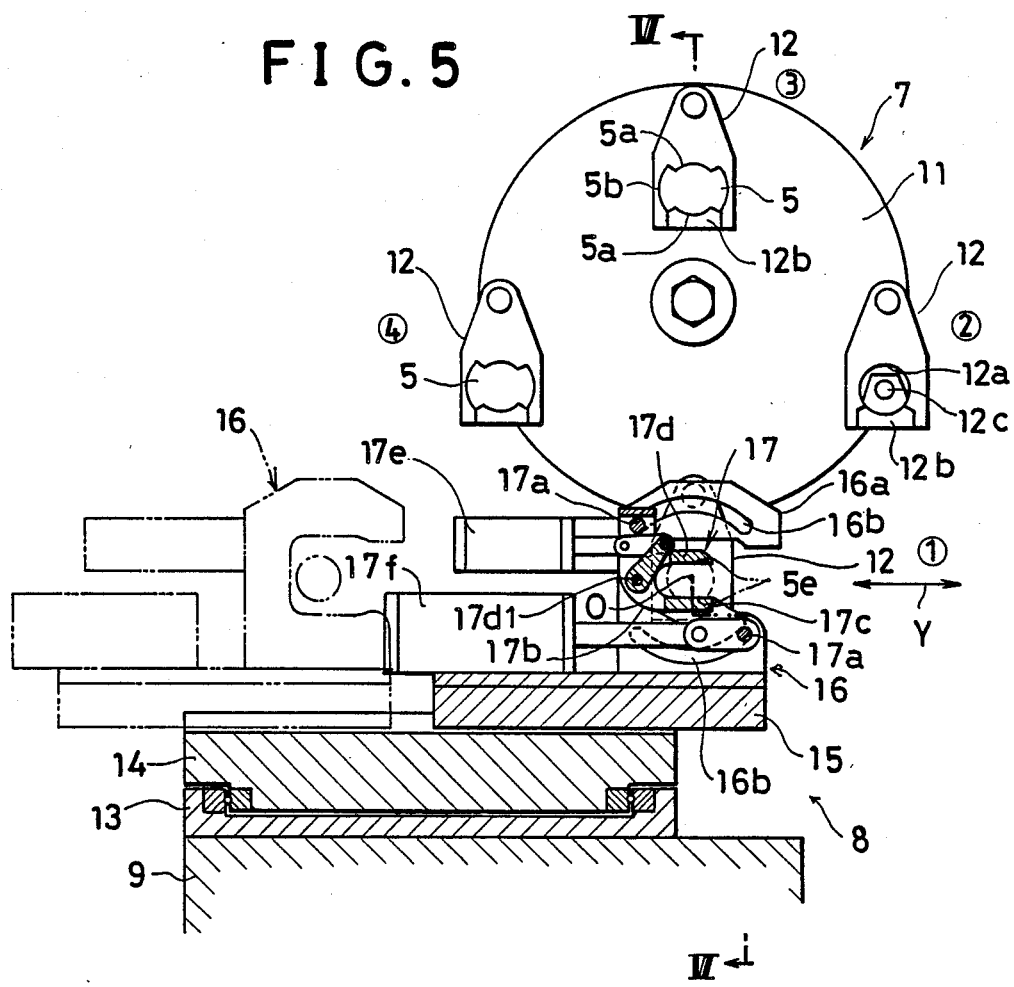
FIG. 5 is a sectional front view taken along the line V—V in FIG. 4.
Figure 6:
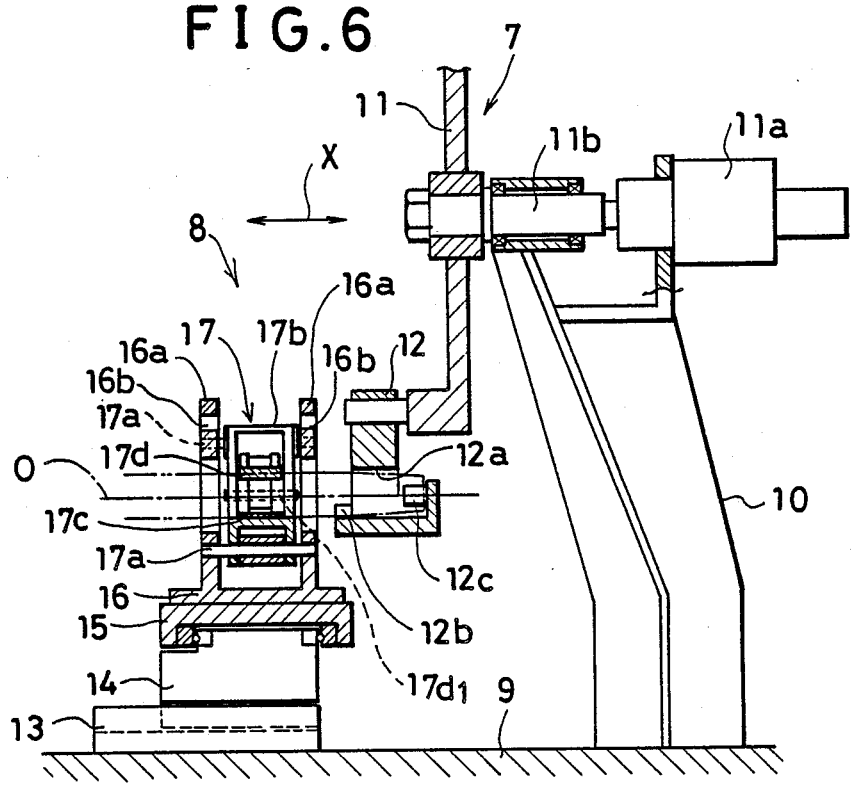
FIG. 6 is a sectional side view taken along the line VI—VI in FIG. 5.

FIGS. 4 through 6 show a gun arm exchange apparatus B disposed at a gun arm exchange site to which the welding gun A can be moved by means of a robot. The gun arm exchange apparatus B comprises a gun arm stocker 7 and a transfer device 8. The arrangement and operation of these will be explained in more detail in the following by taking as the X-axis direction a direction with which the hole axis of the tapered hole 3b is aligned when the welding gun A is moved to the gun arm exchange site.

The gun arm stocker 7 comprises a machine base 9, a supporting pillar 10 erected on the machine base, a stocker plate 11 index-rotated by a motor 11a about a shaft 11b extending in the X-axis direction and four holding means 12 which detachably hold the gun arms 5. The holding means 12 are swingingly attached to the circumferential edge of the stocker plate 11 so as to suspend therefrom. Each holding means 12 is arranged to have an insertion hole 12a at its lower end extending in the X-axis direction so as to permit the tapered portion 5c of the gunarm 5 to be inserted thereinto, a receiving seat that supports the flange at the notches 5a, and a pin 12c insertable into the tail end of the tapered portion 5a so that the gun arm may be detachable in the X-axis direction when it is held not to turn.

The transfer device 8 is arranged to include a first sliding base 14 which is mounted on a guide frame 13 on the machine base 9 and is movable back and forth in the X-axis direction by a conventional drive source (not shown) such as a hydraulic cylinder, and a second sliding base 15 which is mounted on the first sliding base 14 nd is movable by another conventional drive source (not shown) such as another hydraulic cylinder in the Y-axis direction perpendicular to the X-axis direction. It also includes a tool holder 16 mounted on the second sliding base 15 in such a manner that, by movement of the second sliding base 15, the tool holder 16 may be movable back and forth between the first position on the gun arm stocker 7 side, the first position being indicated by a solid line in FIG. 5, and the second position on the welding gun side, the second position being indicated by an imaginary line in FIG. 5, and a clamp member 17 which holds the gun arm 5. The clamp member 17 is turnable about the axial line 0 in the X-axis direction.

Described in more detail, it is arranged as follows: The tool holder 16 is provided with a pair of side walls 16a, 16a facing each other in the X-axis direction, each side wall 16a being formed in the shape of letter C as viewed from the X-axis direction. Each side wall 16a is provided with a pair of the upper and lower arc-shaped guide grooves 16b, 16b arranged to be symmetrical with respect to the axial line 0 taken as the center. The clamp member 17 comprises a movable frame 17b having a pair of pins 17a, 17a which engage respectively with the guide grooves 16b, 16b, the movable frame 17b being interposed between the side walls 16a, 16a, and a stationary claw 17c and a movable claw 17d which clamp the flat portion 5e of the gun arm 5 in such a manner that the center of the gun arm may be aligned with the aforementioned axial line 0. The movable claw 17d is operated by a cylinder 17e mounted on the movable frame 17b so as to swing open and close about the pivot $17d_1$ taken as a fulcrum. A cylinder 17f mounted on the tool holder 16 is connected to the movable frame 17b so that, by the expansion/contraction operation of the cylinder 17f, the movable frame 17b, that is, the clamp member 17 may be guided by the guide grooves 16b, 16b to turn 90 degrees in either the regular or reverse direction to attain the orientation shown in FIG. 5 or that shown in FIG. 7.

Now operational steps to carry out exchange of the gun arm 5 according to this embodiment will be described.

Figure 7:
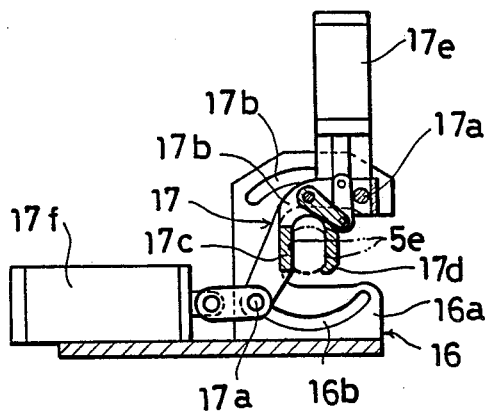
FIG. 7 is a sectional front view illustrating the turning movement of the clamp member.

The tool holder 16 is kept in a standby position at the second position with the clamp member 17 turned to the orientation shown in FIG. 7 and the movable claw 17d opened. Then the welding gun A is moved by a robot so that, first of all, the flat portion 5e of the gun arm 5 attached by insertion to the lower arm holder 3 may approach the stationary claw 17c from the Y-axis direction to come in contact therewith. Next, the movable claw 17d is closed to clamp the flat portion and thereafter the clamp member 17 is turned to attain the orientation shown in FIG. 5. With this operation, the gun arm 5 is turned to the detachable phase. Next, the tool holder 16 is moved, by movement of the first sliding base 14, backward to the outer side in the X-axis direction to pull off the gun arm 5 from the arm holder 3. The tool holder 16 is then moved, by movement of the second sliding base 15, forward (in the Y-axis direction) to the first position and then advances toward the inner side in the X-axis direction, so that the tapered portion 5c of the gun arm 5 is inserted into the insertion hole 12a for a first particular one ① of the holding means 12, this first particular one being then located at the position below the gun arm stocker 7. The movable claw 17d is opened so as to transfer the gun arm to the first particular one ① of the holding means 12.

Next, the tool holder 16 is moved back to the second position and the clamp member 17 is turned to attain the orientation shown in FIG. 7. Then, by the welding gun A moved by a robot, the gun arm 5 attached to the upper arm holder 3 is moved to have the flat portion 5e thereof come in contact with the stationary claw 17c and then pulled off from the arm holder 3 by following the same operational steps as described in the foregoing. On the other hand, the stocker plate 11 is turned clockwise by 90° to index a second particular one ② of the holding means 12 to the below-stocker position. Then, the tool holder 16 is moved forth to the first position to transfer the gun arm 5 to the second particular one ② of the holding means 12.

Next, the tool holder 16 is first moved back to the second position and the stocker plate 11 is turned 90° to index a third particular one ③ the holding means 12 to the below-stocker position, the third particular one ③ holding the gun arm that is to be used next. Then, the tool holder 16 is moved forth to clamp the flat portion 5e of the gun arm 5 being held by the third particular one ③ of the holding means 12. Thereafter the tool holder 16 is moved back toward the outer side in the X-axis direction to pull off the gun 5 from the third particular one ③ of the holding means 12. Then, the tool holder is returned to the second position and advanced toward the inner side in the X-axis direction. During this operation, the clamp member 17 is kept maintained in the orientation shown in FIG. 5 and the gun arm 5 is in the detachable phase, so that when the tool holder 1 is moved for the tapered portion 5c and the flange 5b are inserted respectively into the tapered hole 3b and the receiving recess 3a of the upper arm holder 3. Next, the clamp member 17 is turned to attain the orientation shown in FIG. 7 and the gun arm 5 is turned to the engagement phase to have the gun arm 5 securely fastened in place in the arm holder 3.

Next, the movable claw 17d is opened and the welding gun A carried by a robot is moved to carry away the gun arm 5 upwards of the arm holder 3. Then, the clamp member 17 is turned to attain the orientation shown in FIG. 5 and the tool holder 16 is moved forth to the first position. The gun arm held by a fourth particular one ④ of the holding means 12, the fourth particular one being indexed to the below-stocker position during the foregoing back and forth movement of the tool holder 16, is pulled off from the fourth particular one of the holding means 12 and then attached to the lower arm holder 3 by following the same operational steps as described in the foregoing, thus completing the gun arm exchange operation.

It is also possible to provide two pairs of the arm stocker 7 and the transfer device 8, one pair for the upper arm holder 3 and the other pair for the lower arm holder 3 so as to double the gun arm exchange operation efficiency.

As is clear from the foregoing description, the welding gun of the present invention includes a gun arm which can easily be attached to and detached from the arm holder simply by phase be attached to and detached from the arm holder simply by phase alignment in which the notches of the flange are aligned with the corresponding locking projections. This facilitates the gun arm exchange operation. In addition, the gun arm can be exchanged without doing anything to the power and water supply systems thereof, thus simplifying the exchange operation for improvement of the operation efficiency.

Furthermore, according to the present invention, a gun arm exchange apparatus is provided with which the gun arm can be exchanged automatically so that it has an effect contributing to realization of an eventual complete automation of welding operation including the exchange of the gun arm of a welding gun.

It is readily apparent that the above-described has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. An exchangeable arm welding gun comprising a gun body, an arm holder on the gun body, and a gun arm detachably fitted to the arm holder,
    said gun arm having a tail end portion,
    a flange with notches provided on the tail end portion,
    and a tapered portion formed on said tail end portion extending rearwards of the flange;
    said arm holder including
    a receiving recess which turnably receives the flange of the gun arm,
    a tapered hole formed in the arm holder sized for the tapered portion to be fitted thereinto via the receiving recess, and
    locking projections corresponding in shape to the notches of the flange and provided along an inner circumference of an opening end of the receiving recess.

2. An exchangeable gun arm welding gun as set forth in claim 1, further comprising a secondary terminal of a transformer mounted in the gun body and connected to the arm holder, and a cooling water supply port formed in the arm holder communicating with said tapered hole.

3. A gun arm exchange apparatus for a welding gun comprising a gun body, an arm holder on the gun body, and a gun arm detachably fitted to the arm holder,
    said gun arm having a tail end portion,
    a flange with notches provided on the tail end portion,
    and a tapered portion formed on said tail end portion extending rearwards of the flange;
    said arm holder including
    a receiving recess which turnably receives the flange of the gun arm,
    a tapered hole formed in the arm holder sized for the tapered portion to be fitted thereinto via the receiving recess, and
    locking projections corresponding in shape to the notches of the flange and provided along an inner circumference of an opening end of the receiving recess, said apparatus comprising:

a gun arm stocker having a plurality of holders each of which can detachably hold one of said gun arms; and a transfer device that transfers a gun arm from one to the other between the gun arm stocker and the welding gun, wherein said transfer device comprises a tool holder which is movable between a first position on the gun arm stocker side and a second position on the welding gun side and which is also movable back and forth in an X-axis direction consistent with the axis of the tapered hole formed in the arm holder of the welding gun, and a clamp member that holds the gun arm, said clamp member being provided on the tool holder in such a manner as to be turnable around the axial line in the X-axis direction.

4. A gun arm exchange apparatus as set forth in claim 3 wherein said gun arm stocker includes:

a vertical supporting pillar, a shaft, horizontally rotatably mounted on said pillar, a stocker plate mounted on said shaft, means for index-rotating said shaft, and a plurality of holding means each swingingly attached to a circumferential edge of said stocker plate for detachably holding one of said gun arms.

5. The gun arm exchange apparatus as set forth in claim 3, wherein said transfer device further includes:

a guide frame, a first sliding base movably mounted on said guide frame in a direction parallel with said X-axis direction, a second sliding base movably mounted on said first sliding base in a direction perpendicular to said X-axis direction, said tool holder being mounted on said second sliding base.

6. A gun arm exchange apparatus as set forth in claim 5, wherein said tool holder includes a pair of vertical side walls each formed in the shape of letter C as viewed from the X-axis direction, each side wall being provided with a pair of upper and lower arc-shaped guide grooves; and wherein said clamping member includes a movable frame, pins on said movable frame engaged with said guide grooves, a stationary claw on said frame, a movable claw on said frame, means for moving said movable claw towards and away from said stationary claw, and means on said tool holder for reversibly turning said movable frame.

* * * * *